United States Patent
Watanabe

[19]

[11] Patent Number: 5,957,550
[45] Date of Patent: Sep. 28, 1999

[54] BRAKING FORCE CONTROLLING SYSTEM FOR AUTOMOTIVE VEHICLE

[75] Inventor: Takashi Watanabe, Nagoya, Japan

[73] Assignee: Denso Corporation, Kariya, Japan

[21] Appl. No.: 08/845,437

[22] Filed: Apr. 25, 1997

[30] Foreign Application Priority Data

Apr. 26, 1996 [JP] Japan ................................. 8-108284
May 20, 1996 [JP] Japan ................................. 8-125007

[51] Int. Cl.⁶ .................................................. B60T 8/34
[52] U.S. Cl. ................................... 303/175; 303/113.2
[58] Field of Search .......................... 303/113.2, 175, 303/190, DIG. 6

[56] References Cited

U.S. PATENT DOCUMENTS

| | | | |
|---|---|---|---|
| 4,893,880 | 1/1990 | Arikawa et al. | 303/113.5 |
| 5,093,790 | 3/1992 | Shiraishi et al. | 303/157 |
| 5,292,187 | 3/1994 | Onaka et al. | 180/197 |
| 5,474,368 | 12/1995 | Sano | 303/163 |
| 5,599,075 | 2/1997 | Hara et al. | 303/143 |
| 5,651,593 | 7/1997 | Shitani et al. | 303/190 |
| 5,653,516 | 8/1997 | Taniguchi et al. | 303/150 |

FOREIGN PATENT DOCUMENTS

| | | |
|---|---|---|
| 2-095927 | 4/1990 | Japan . |
| 3-135845 | 6/1991 | Japan . |
| 4-166464 | 6/1992 | Japan . |
| 5-162630 | 6/1993 | Japan . |
| 6-072303 | 3/1994 | Japan . |
| 7-112659 | 5/1995 | Japan . |

Primary Examiner—Robert J. Oberleitner
Assistant Examiner—Robert A. Siconolfi
Attorney, Agent, or Firm—Pillsbury Madison & Sutro LLP

[57] ABSTRACT

An antiskid brake system for an automotive vehicle is provided which is designed to accumulate a wheel slippage parameter indicating a slippage condition of each wheel for given program cycles and regulate the brake pressure acting on each wheel based on the accumulated wheel slippage parameters. This improves the instability of antiskid brake control due to a small variation in tire-road adhesive $\mu$, irregularities of a road surface, turning of the vehicle, or a difference in diameter between tires. The antiskid brake system is alternatively designed to determine a slippage condition of one of wheels of a vehicle equipped with a rotation restraint mechanism such as an limited slip differential not only based on a slippage ratio of the one of the wheel, but also based on a slippage ratio of the other of the wheels. This permits a braking force acting on each of the wheels to be regulated precisely.

6 Claims, 14 Drawing Sheets

FIG. 10

| CONTROL MODE | SOLENOID ENERGIZATION |
|---|---|
| PRESSURE-REDUCING MODE | PRESSURE-REDUCING AND PRESSURE-HOLDING CURRENTS ARE PROVIDED CYCLICALLY<br>P-INCREASE<br>P-HOLD<br>P-REDUCTION<br>1p 2p ...<br>TD TH |
| PRESSURE-HOLDING MODE | PRESSURE-HOLDING CURRENT CONTINUOUSLY<br>START<br>P-HOLD |
| PRESSURE-STEPPING UP MODE | PRESSURE-INCREASING PULSE SIGNAL IS OUTPUTTED N TIMES<br>START<br>P-INCREASE COMMAND<br>P-HOLD COMMAND<br>SOLENOID<br>P-INCREASE<br>P-HOLD<br>P-REDUCE<br>1  2 ... N<br>KU |
| DRIVER-CONTROLLED BRAKE MODE | START<br>TURN OFF SOLENOIDE |

FIG. 15

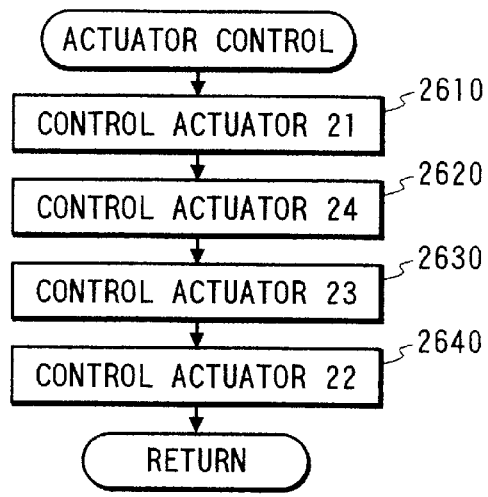

```
ACTUATOR CONTROL
    ↓
CONTROL ACTUATOR 21    — 2610
    ↓
CONTROL ACTUATOR 24    — 2620
    ↓
CONTROL ACTUATOR 23    — 2630
    ↓
CONTROL ACTUATOR 22    — 2640
    ↓
RETURN
```

FIG. 16

| CONTROL MODE | SOLENOID ENERGIZATION |
|---|---|
| PRESSURE-REDUCING MODE | P-INCREASE<br>P-HOLD<br>P-REDUCTION ——— ----- |
| PRESSURE-HOLDING MODE | P-INCREASE<br>P-HOLD ——— -----<br>P-REDUCTION |
| PRESSURE-STEPPING UP MODE | START ▼ ... END ▼<br>P-INCREASE<br>P-HOLD<br>P-REDUCTION<br>KH1 OR KH2 OR KH3, KU, N TIMES |
| DRIVER-CONTROLLED BRAKE MODE | START<br>TURN OFF SOLENOIDE |

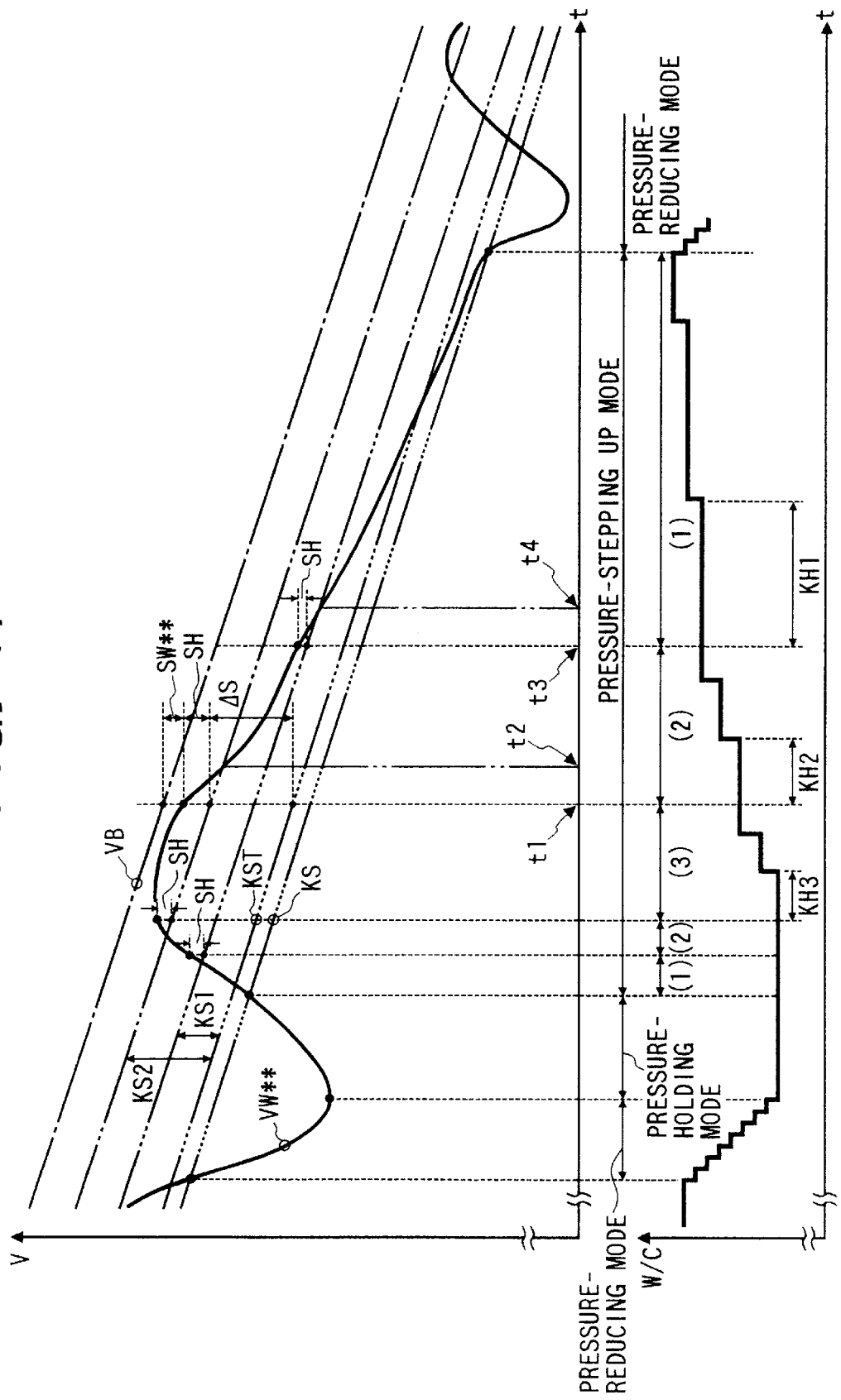

BRAKING FORCE CONTROLLING SYSTEM FOR AUTOMOTIVE VEHICLE

BACKGROUND OF THE INVENTION

1. Technical Field of Invention

The present invention relates generally to a braking force controlling system for automotive vehicles, and more particularly to an antiskid brake system designed to regulate the brake fluid pressure developing a braking force acting on each wheel according to a wheel slippage during braking so as to bring the slip ratio into a suitable range.

2. Description of Related Art

Antiskid brake systems which determine a slip ratio of each wheel during braking and control the brake fluid pressure acting on each wheel so as to bring each wheel into an allowable range of slip ratio (usually, 10% to 20%) within which the vehicle can be braked in safety are well known.

In such antiskid brake systems, when the acceleration of one of the wheels shows a negative value when a slip ratio thereof exceeds a target value (e.g., 15%) during braking, the brake fluid pressure applied to that wheel is reduced. If the acceleration shows another value, the brake fluid pressure is held as is. When the slip ratio becomes less than the target value, the brake fluid pressure is increased. Instead of such direct comparison between an actual slip ratio with a target value, a physical quantity corresponding to the slip ratio such as wheel speed may be used. Specifically, an actual wheel speed may be determined and compared with a target wheel speed corresponding to a target slip ratio.

The above conventional antiskid brake systems, however, have a drawback. A change in wheel speed caused by a change in tire-road friction or adhesion $\mu$ during braking, adversely affects the comparison between the actual slip ratio and the target slip ratio or between the actual wheel speed and the target wheel speed, thereby resulting in instability of antiskid brake control.

The instability of antiskid brake control also results from a change in wheel speed due to irregularities of a road surface, turning of the vehicle, or a difference in diameter between tires.

SUMMARY OF THE INVENTION

A principal objective of the present invention to avoid the disadvantages of the prior art.

Another objective of the present invention is to provide a brake control system designed to determine a skidding condition of each wheel required to regulate a braking force acting thereon precisely.

Still another objective of the present invention is to provide a brake control system designed to improve the instability of antiskid brake control due to a small variation in tire-road adhesive $\mu$, irregularities of a road surface, turning of the vehicle, or a difference in diameter between tires.

According to one aspect of the invention, a brake control system for a vehicle comprises: (a) a brake fluid pressure generating units for generating brake fluid pressure according to a braking operation of a driver of the vehicle; (b) a braking force generating units for generating braking force acting on wheel of the vehicle in response to the brake fluid pressure provided from the brake fluid pressure generating units; (c) a wheel speed determining means for determining speeds of the wheels; (d) a skid condition determining means for determining given skid parameters which indicate a skid condition of the wheel in a cycle based on the speed of the wheels determined by the wheel speed determining means to determine a cumulative value of the skid parameters, and (e) a pressure regulating means for regulating the brake fluid pressure provided from the brake fluid pressure generating units to the braking force generating units based on the cumulative value determined by the skid condition determining means for optimizing a braking effort acting on the wheel.

In the preferred mode of the invention, the pressure regulating means determines whether the brake fluid pressure is to be changed or not based on a slip ratio or a physical quantity corresponding to the slip ratio. The slip ratio is determined based on the speed of the wheel wheels determined by the wheel speed determining means. If the brake fluid pressure must be changed, the pressure which is regulating means changes the brake fluid pressure provided to the braking force generating means according to the cumulative value determined by the skid condition determining means.

The pressure regulating means increases the brake fluid pressure provided to the braking force generating means according to the cumulative value determined by the skid condition determining means.

The pressure regulating means performs a pressure-increasing operation cyclically in which the brake fluid pressure that is provided to the braking force generating means is increased stepwise when the cumulative value is greater than a given value. The cumulative value is cleared to zero. The number of times the pressure-increasing operation is repeated is fixed at a given value.

The pressure regulating means may regulate the brake fluid pressure that is provided to the braking force generating means based on a value derived by correcting the cumulative value using a given parameter indicating irregularities of a road surface. The given parameter is a difference between an average acceleration of the wheel for a given period of time and an actual acceleration of the wheel.

The given skid parameter indicating the skid condition of the wheel may be a difference between a target slip ratio and an actual slip ratio of the wheel.

According to another aspect of the invention, an antiskid brake control system for a vehicle which comprises: (a) a brake fluid pressure generating means for generating a brake fluid pressure according to a braking operation of a driver of the vehicle; (b) a braking force generating means for generating braking forces acting on wheels of the vehicle in response to the brake fluid pressure provided from the brake fluid pressure generating means; (c) a wheel speed determining means for determining speeds of the wheels; (d) a cumulative slip ratio difference determining means for determining a cumulative slip ratio difference of each of the wheels, the cumulative slip ratio difference being determined by calculating in a cycle a slip ratio difference between a target slip ratio and an actual slip ratio of one of the wheels determined based the speed of the one of the wheels determined by the wheel speed determining means and an estimated vehicle speed determined for each of the wheels and accumulating the slip ratio differences; and (e) a pressure regulating means for regulating the brake fluid pressure that is provided to the braking force generating means to control each of the braking forces acting on one of the wheels based on corresponding one of the cumulative slip ratio difference determined by the cumulative slip ratio difference determining means.

In the preferred mode of the invention, each of the estimated vehicle speeds is determined based on a vehicle speed estimated by behavior of all the wheels and the speed of one of the wheels.

According to another aspect of the invention, there is provided an antiskid brake control system for a vehicle which comprises: (a) a brake fluid pressure generating means for generating a brake fluid pressure according to a braking operation of a driver of the vehicle; (b) a braking force generating means for generating a braking force acting on a wheel of the vehicle in response to the brake fluid pressure provided from the brake fluid pressure generating means; (c) a wheel speed determining means for determining a speed of the wheel; (d) a pressure regulating means for regulating the brake fluid pressure provided from the brake fluid pressure generating means to the braking force generating means for optimizing a braking effort acting on the wheel; (e) a skid condition determining means for determining a given skid parameter indicating a skid condition of the wheel in a cycle based on the speed of the wheels determined by the wheel speed determining means to determine a cumulative value of the skid parameters; and (f) a timing determining means for determining timing, with which the pressure regulating means regulates the brake fluid pressure provided to the braking force generating means, according to the cumulative value of the skid parameters determined by the skid condition determining means.

According to another aspect of the invention, a braking condition determining apparatus for a vehicle is equipped with a rotation restraint mechanism which produces a rotation restraint between a first wheel and a second wheel so that driving torque and braking force are transmitted from one of the first and second wheels from the other. The apparatus comprises: (a) a first braking force generating mechanism generating a braking force acting on the first wheel; (b) a second braking force generating mechanism generating a braking force acting on the second wheel; (c) a first skid condition determining means for determining a skid condition of the first wheel; (d) a second skid condition determining means for determining a skid condition of the second wheel; and (e) a braking condition determining means for determining a braking condition of each of the first and second wheels based on the skid conditions determined by the first and second skid condition determining means.

In the preferred mode of the invention, the vehicle is a four-wheel drive automotive vehicle which produces the rotation restraint between front and rear wheels through the rotation restraint mechanism.

The vehicle may alternatively be a two-wheel drive automotive vehicle which produces the rotation restraint between right and left wheels through the rotation restraint mechanism.

According to another aspect of the invention, a brake control apparatus for a vehicle equipped with a rotation restraint mechanism which produces a rotation restraint between a first wheel and a second wheel so that driving torque and braking force are transmitted from one of the first and second wheels from the other, which comprises: (a) a first braking force generating mechanism generating a braking force acting on the first wheel; (b) a second braking force generating mechanism generating a braking force acting on the second wheel; (c) a first skid condition determining means for determining a skid condition of the first wheel; (d) a second skid condition determining means for determining a skid condition of the second wheel; (e) a braking condition determining means for determining a braking condition of each of the first and second wheels based on the skid conditions determined by the first and second skid condition determining means; and (f) a braking force adjusting means for adjusting the braking forces produced by the first and second braking force generating units according to the braking conditions of the first and second wheels determined by the braking condition determining means.

In the preferred mode of the invention, the first and second braking force generating units are responsive to brake fluid pressures developed by a brake master cylinder to produce the braking forces acting on the first and second wheels. The braking force adjusting means selectively increases, reduces, and holds the brake fluid pressures to adjust the braking forces produced by the first and second braking force generating means.

According to still another aspect of the invention, a driving torque control apparatus for a vehicle equipped with a rotation restraint mechanism which produces a rotation restraint between a first wheel and a second wheel so that driving torque is transmitted from one of the first and second wheels from the other, comprises: (a) a first braking force generating mechanism generating a braking force acting on the first wheel; (b) a second braking force generating mechanism generating a braking force acting on the second wheel; (c) a first skid condition determining means for determining a skid condition of the first wheel; (d) a second skid condition determining means for determining a skid condition of the second wheel; (e) a braking condition determining means for determining a braking condition of each of the first and second wheels based on the skid conditions determined by the first and second skid condition determining means; and (f) a driving torque adjusting means for adjusting driving torque acting on each of the first and second wheels according to the braking conditions of the first and second wheels determined by the braking condition determining means.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings:

FIG. 10 is a table which shows solenoid activation in a pressure-reducing mode, a pressure-holding mode, a pressure-stepping up mode, and a driver-controlled brake mode;

FIG. 15 is a flowchart of a sub-program for controlling actuators;

FIG. 16 is a table which shows solenoid activation in a pressure-reducing mode, a pressure-holding mode, a pressure-stepping up mode, and a driver-controlled brake mode; and FIG. 17 is a time chart which shows an operation of an antiskid brake system of the second embodiment.

DESCRIPTION OF THE PREFERRED EMBODIMENT

Figure 1:
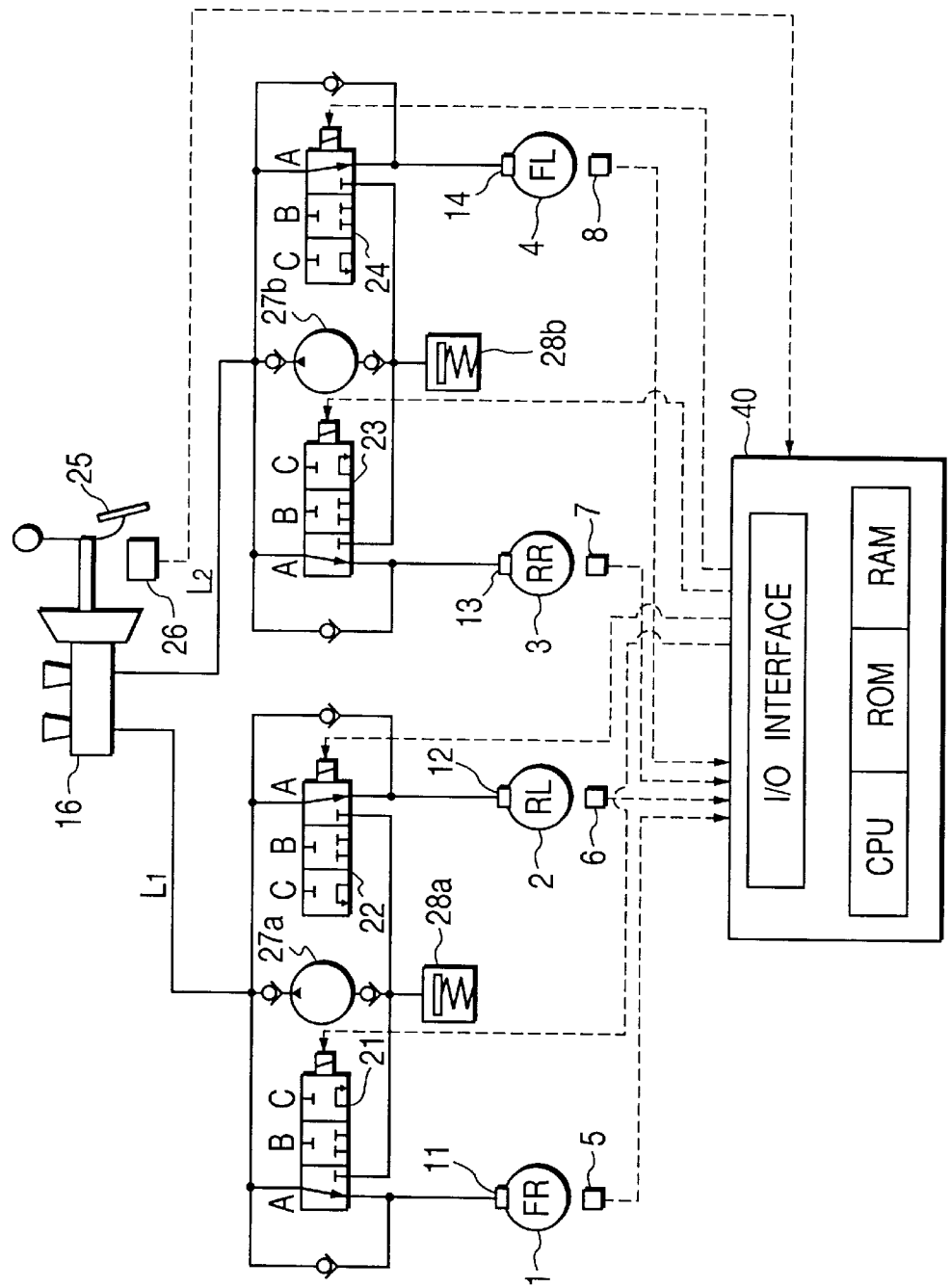
FIG. 1 is a circuit diagram which shows an antiskid brake system according to the first embodiment of the invention.
Figure 2:
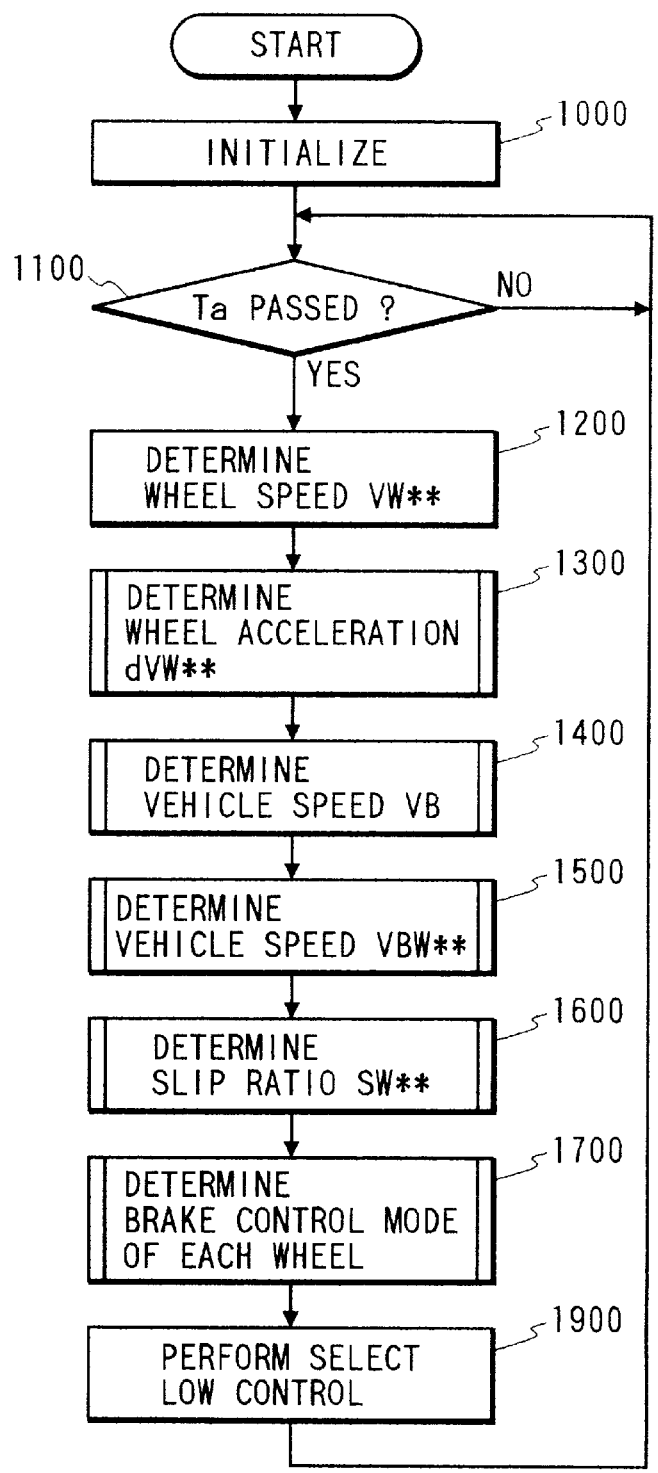
FIG. 2 is a flowchart of a main program of antiskid brake control according to the first embodiment.

Referring now to the drawings, wherein like reference numbers refer to like parts throughout several views, particularly to FIG. 1, there is shown an antiskid brake system according to the present invention.

The antiskid brake system is installed in a engine front drive vehicle and is equipped with the so-called X type dual circuit (also referred to as a diagonal dual circuit) consisting of a front right-rear left hydraulic line $L_1$ (referred to as a first hydraulic line hereinafter) for controlling braking forces acting on front right and rear left wheels 1 and 2 and a front left-rear right hydraulic line $L_2$ (referred to as a second hydraulic line hereinafter) for controlling braking forces acting on rear right and front left wheels 3 and 4.

Electromagnetic or magnetoresistive wheel speed sensors 5, 6, 7, and 8 are installed on the wheels 1 to 4, respectively, and provide pulse signals according to the speeds of the wheels 1 to 4 to an electronic control unit 40. Wheel brakes 11 to 14 are installed on the wheels 1 to 4 which include wheel cylinders to which brake fluid pressure is applied by a tandem master cylinder 16 through actuators 21 to 24.

The master cylinder 16 is mechanically connected to a brake pedal 25 and develops the brake fluid pressure according to the pedal effort of a vehicle operator. A stop switch 26 is installed on the brake pedal 25 which provides an ON-signal when the brake pedal 25 is depressed and an OFF-signal when the brake pedal 25 is released.

Each of the actuators 21 to 24 includes a three-position solenoid valve designed to assume a pressure rise enable valve position A, a pressure-holding valve position B, and a pressure-reducing valve position C. The pressure rise enable valve position A is established when each of the actuators 21 to 24 is deenergized to communicate the master cylinder 16 with the wheel cylinder of one of the wheel brakes 11 to 14, allowing the brake fluid pressure supplied to the wheel cylinder (referred to as wheel cylinder pressure W/C hereinafter) to be increased according to the pressure developed in the master cylinder 16 The pressure-holding and pressure-reducing valve positions B and C are established selectively according to the magnitude of current applied to each of the actuators 21 to 24. In the pressure-holding valve position B, the fluid communication between the master cylinder 16 with each of the wheel cylinders of the wheel brakes 11 to 14 is blocked to hold the wheel cylinder pressure W/C of one of the wheel brakes 11 to 14 as is. In the pressure-reducing valve position C, brake fluid within the wheel cylinder of each of the wheel brakes 11 to 14 is drained into one of reservoirs 28a and 28b disposed within the first and second hydraulic lines $L_1$ and $L_2$ to reduce the wheel cylinder pressure W/C.

Each of the actuators 21 to 24 is switched to the pressure-reducing valve position C by the electronic control unit 40 during antiskid brake control to drain the brake fluid out of the wheel cylinder of one of the wheel brakes 11 to 14 into corresponding one of the reservoirs 28a and 28b, but it becomes impossible to reduce the wheel cylinder pressure W/C further when corresponding one of the reservoirs 28a and 28b becomes filled up. In order to avoid this drawback, pumps 27a and 27b are installed between lines connected to the reservoirs 28a and 28b and lines connected to the master cylinder 16, respectively, for pumping the brake fluid out of the reservoirs 28a and 28b into the master cylinder 16.

The electronic control unit 40 includes a microcomputer consisting of a CPU, a ROM, a RAM, and an input/output interface and is activated upon turning on of an ignition switch (not shown) to control the actuators 21 to 24 based on signals from the wheel speed sensors 5 to 8 and the stop switch 26 according to an antiskid brake control program, as will be described below in detail.

FIGS. 2 to 9 show flowcharts of the antiskid brake control program performed by the electronic control unit 40.

After entering the program, the routine proceeds to step 1000 wherein initialization is performed to clear a memory and reset flags.

The routine proceeds to step 1100 wherein whether a given period of time Ta (e.g., 5 ms) has passed or not is determined. The given period of time is an interval during which a sequence of operations following step 1100 is carried out.

If a YES answer is obtained, then the routine proceeds to step 1200 wherein wheel speed VW of each of the wheels 1 to 4 is determined based on a signal from one of the wheel speed sensors 5 to 8. Note that the suffix "" of the wheel speed VW expresses FR, RL, RR, or FL standing for the front right wheel 1, the rear left wheel 2, the rear right wheel 3, and the front left wheel 4**, respectively.

Figure 3:
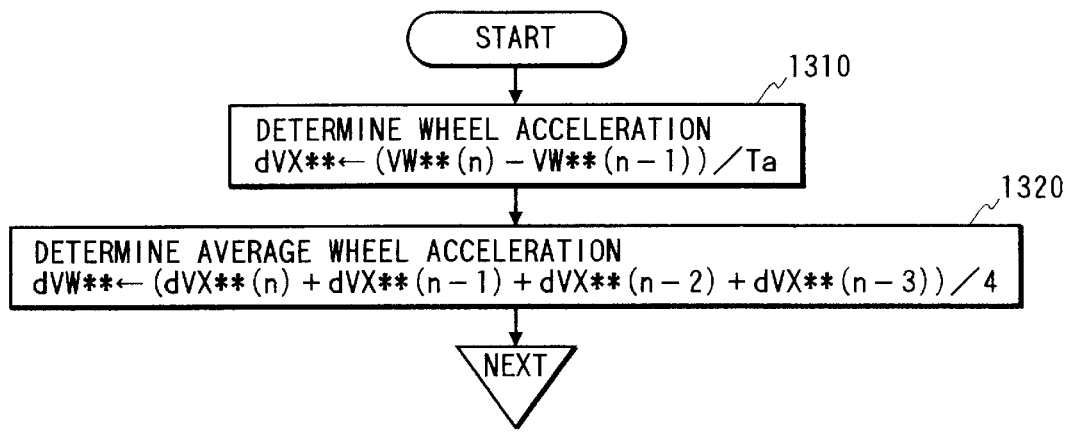
FIG. 3 is a flowchart of a sub-program which determines the acceleration of each wheel.

The routine proceeds to step 1300 and enters a sub-program shown in FIG. 3.

First, in step 1310, wheel acceleration dVX of each of the wheels 1 to 4 is determined using the wheel speed VW according to the equation below.

$$dVX^{} \leftarrow (VW^{}(n) - VW^{**}(n-1))/Ta \qquad (1)$$

where n indicates a number of a program cycle. Specifically, VW**(n−1) indicates the wheel speed determined one program cycle earlier.

The routine proceeds to step 1320 wherein a given filtering operation is performed according to the equation (2) below to determine an average value dVW of the wheel accelerations dVX determined for a given number of program cycles (e.g., four cycles from n to n−3).

$$dVW^{} \leftarrow (dVX^{}(n) + dVX^{}(n-1) + dVX^{}(n-2) + dVX^{**}(n-3))/4 \qquad (2)$$

Figure 4:
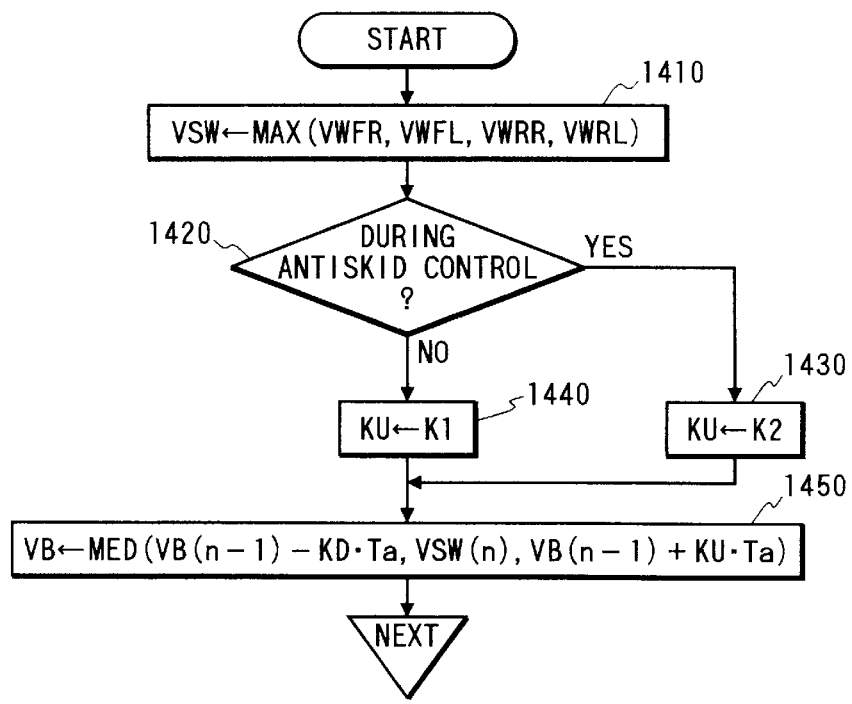
FIG. 4 is a flowchart of a sub-program which determines the vehicle speed based on wheel speeds of all wheels.

After step 1320, the routine proceeds to step 1400 wherein a common vehicle speed VB is determined according to a sub-program shown in FIG. 4.

First, in step 1410, the greatest one VSW of the wheel speeds VW** is determined according to the equation (4) below.

$$VSW \leftarrow MAX(VWFR, VWRL, VWRR, VWFL) \qquad (3)$$

where MAX is an operator which determines the greatest one of values in parentheses.

The routine proceeds to step 1420 wherein it is determined whether the system is under the antiskid brake control or not. If a YES answer is obtained, then the routine proceeds to step 1430 wherein an upper acceleration limit KU is set to K2 (e.g., 2.0 G). Alternatively, if a NO answer is obtained, then the routine proceeds to step 1440 wherein the upper acceleration limit KU is set to K1 (e.g., 0.5 G).

The routine proceeds to step 1450 wherein the vehicle speed VB is determined according to the equation (4) below.

$$VB \leftarrow MED(VB(n-1)-KD \cdot Ta, VSW(n), VB(n-1)+KU \cdot Ta) \quad (4)$$

where MED is an operator which determines a middle one of values in parentheses, and KD is a lower acceleration limit of, for example, 1.2 G.

Figure 5:
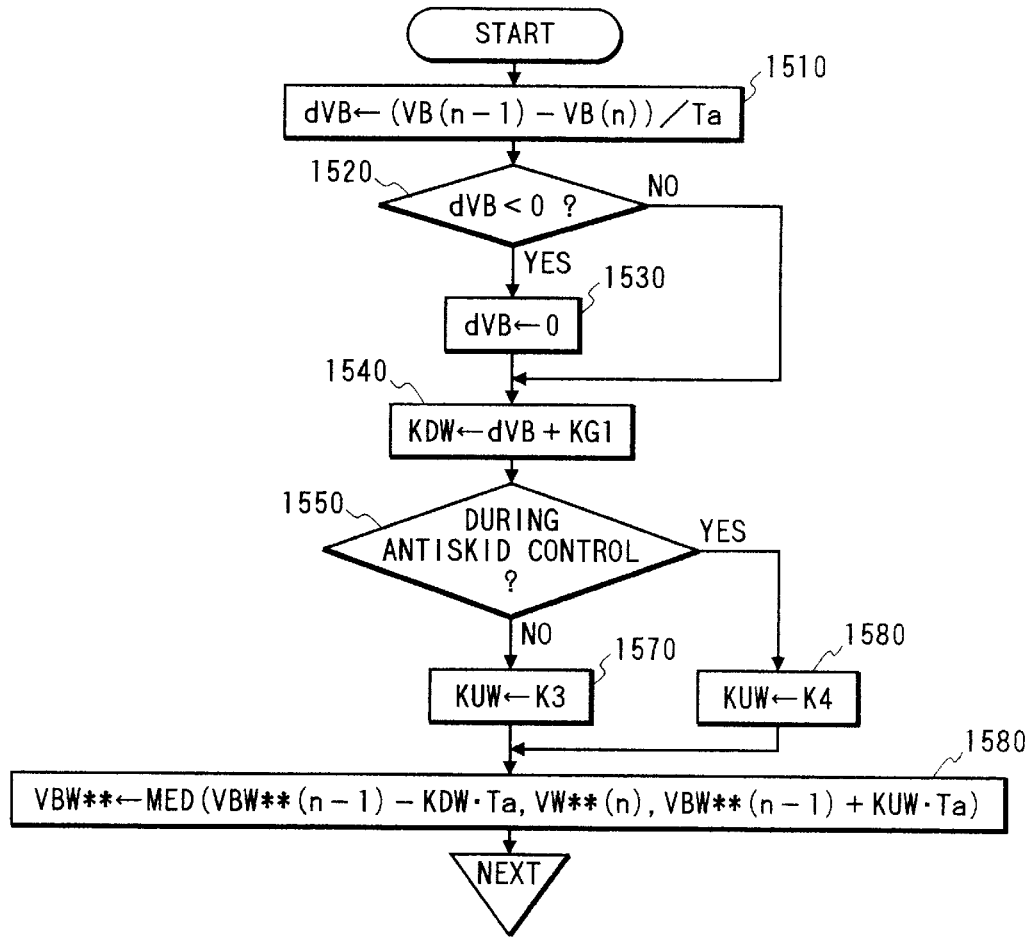
FIG. 5 is a flowchart of a sub-program which determines the vehicle speed based on wheel speed of each wheel.

After step 1450, the routine proceeds to step 1500 wherein vehicle speed VBW is determined based on the wheel speed VW of each wheel according to a sub-program as shown in FIG. 5.

First, in step 1510, common vehicle acceleration dVB is determined according to the equation (5) below.

$$dVB \leftarrow (VB(n-1)-VB(n))/Ta \quad (5)$$

The routine proceeds to step 1520 wherein it is determined whether dVB is less than zero (0) or not. If a YES answer is obtained, then the routine proceeds to step 1530 wherein the vehicle acceleration dVB is set to zero (0). Alternatively, if a NO answer is obtained, then the routine proceeds directly to step 1540.

In step 1540, a vehicle deceleration guarding value KDW is determined according to the equation (6) below.

$$KDW \leftarrow dVB+KG1 \quad (6)$$

where KG1 is a correction value of, for example, 0.1 G.

The routine proceeds to step 1550 wherein it is determined whether the system is under the antiskid brake control or not. If a YES answer is obtained, then the routine proceeds to step 1570 wherein a vehicle acceleration guarding value KUW is set to K4 (e.g., 2.0 G). Alternatively, if a NO answer is obtained meaning that the system is not under the antiskid brake control, then the routine proceeds to step 1560 wherein the vehicle acceleration guarding value KUW is set to K3 (e.g., 0.5 G).

After step 1570 or 1560, the routine proceeds to step 1580 wherein the vehicle speed VBW** is determined according to the equation (7) below.

$$VBW^{} \leftarrow MED(VBW^{}(n-1)-KDW \cdot Ta, VW^{}(n), VBW^{}(n-1)+KUW \cdot Ta) \quad (7)$$

Figure 6:
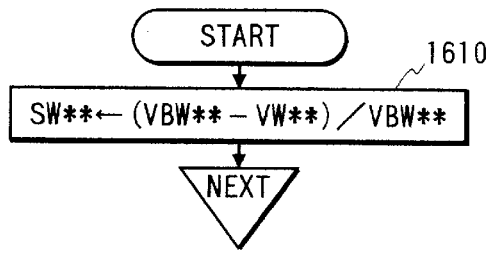
FIG. 6 is a flowchart of a sub-program which determines a slip ratio of each wheel.

The routine proceeds to step 1600 and enters a sub-program, as shown in FIG. 6, to determine in step 1610 a slip ratio SW** of each wheel using the equation (8) below.

$$SW^{} \leftarrow (VBW^{}-VW^{})/VBW^{} \quad (8)$$

Figure 7:
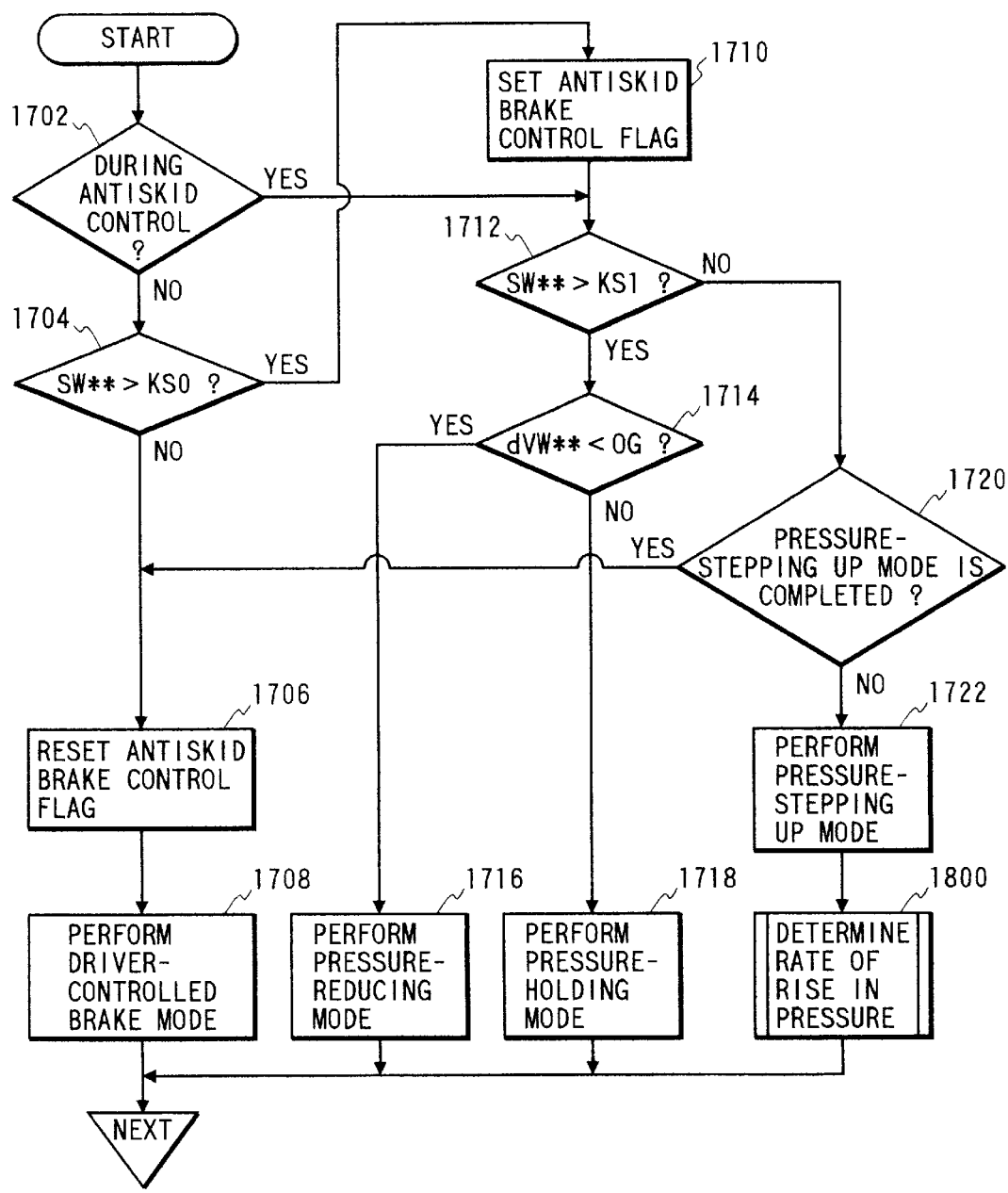
FIG. 7 is a flowchart of a sub-program which determines a control mode of each wheel.

After step 1610, the routine proceeds to step 1700 and enters a sub-program, as shown in FIG. 7, to determine a brake control mode for each of the wheels 1 to 4. The following discussion will refer to the brake control only for the front right wheel 1 for the sake of simplicity of disclosure.

First, in step 1702, it is determined whether the front-right wheel 1 is under the antiskid brake control or not. If a NO answer is obtained, then the routine proceeds to step 1704 wherein it is determined whether the slip ratio SW of the wheel 1 derived in step 1600 is greater than a first target slip ratio KS0 (e.g., 20%) or not. If a NO answer is obtained (SW<KS0), then the routine proceeds to step 1706 wherein an antiskid brake control flag is reset to zero (0) indicating that the antiskid brake control needs not be performed. The routine then proceeds to step 1708 wherein a driver-controlled brake mode is entered to turn off the actuator 21, establishing the fluid communication between the master cylinder 16 and the wheel brake 11 in the pressure rise enable valve position A so that the wheel cylinder pressure W/C can be increased according to the pedal effort produced by the driver. If a YES answer is obtained in step 1704 (SW≧KS0) meaning that the wheel 1 has begun skidding greatly and that it is necessary to perform the antiskid brake control, then the routine proceeds to step 1710** wherein the antiskid brake control flag is set to one (1).

The routine proceeds to step 1712 wherein it is determined whether the slip ratio SW of the wheel 1 derived in step 1600 is greater than a second target slip ratio KS1 (e.g., 15%) or not. If a YES answer is obtained (SW≧KS1), then the routine proceeds to step 1714 wherein it is determined whether a change in the wheel speed VW of the wheel 1 is not yet reversed from a deceleration direction to an acceleration direction due to release of the braking effort by brake fluid pressure control, that is, whether the wheel acceleration dVW derived in step 1300 is still less than zero (0 G) or not.

If a YES answer is obtained in step 1714 (dVW<0) meaning that the change in the wheel speed VW still shows the deceleration direction, then the routine proceeds to step 1716 wherein a pressure-reducing mode is entered to switch the actuator 21 to the pressure-reducing valve position C to reduce the wheel cylinder pressure W/C of the wheel brake 11.

Alternatively, if a NO answer is obtained in step 1714 (dVW≧0) meaning that the change in the wheel speed VW has been reversed from the deceleration direction to the acceleration direction, then the routine proceeds to step 1718 wherein a pressure-holding mode is entered to switch the actuator 21 to the pressure-holding valve position B to hold the wheel cylinder pressure W/C of the wheel brake 11 as is.

If a NO answer is obtained in step 1712 meaning that the slip ratio SW of the wheel 1 is smaller than the second target slip ratio KS1, then the routine proceeds to step 1720 wherein it is determined whether a pressure-stepping up mode in which a pressure-increasing pulse signal is provided to the actuator 21 to change the pressure-holding valve position B to the pressure rise enable valve position A for increasing the wheel cylinder pressure W/C stepwise has been performed a given number of times or not, that is, whether the pressure-increasing pulse signal has been outputted the given number of times or not. If a YES answer is obtained, it is then concluded that the wheel slippage is eliminated completely and that the wheel 1 hardly slips even if the brake fluid control is terminated, and the routine proceeds to step 1706**.

Figure 8:
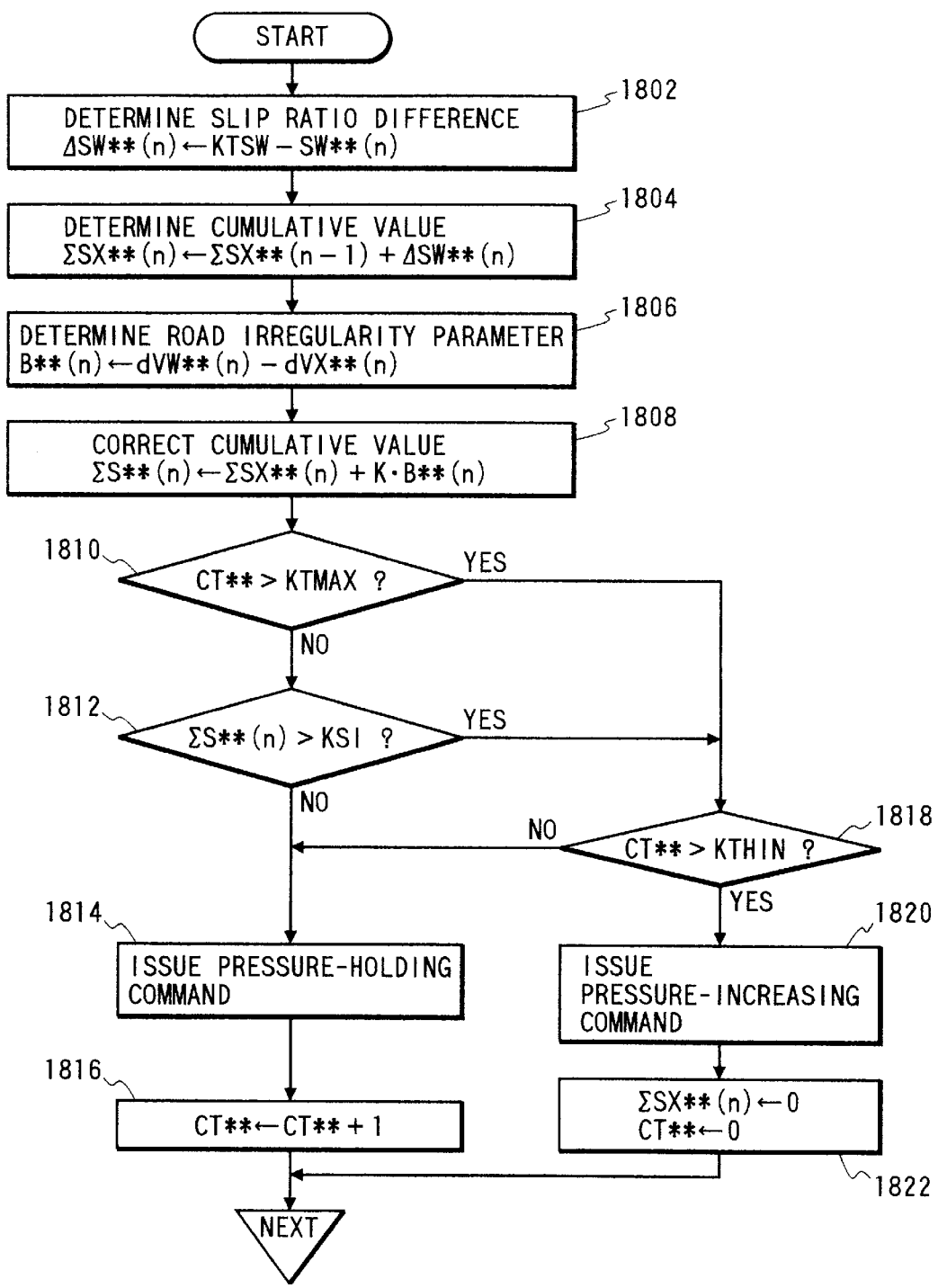
FIG. 8 is a flowchart of a sub-program which determines a rate of increase in brake fluid pressure in a pressure-stepping up mode.

Alternatively, if a NO answer is obtained in step 1720 meaning that the pressure-stepping up mode has not yet been performed the given number of times, then the routine proceeds to step 1722 wherein the pressure-stepping up mode is provided again. The routine proceeds to step 1800 and enters a sub-program, as shown in FIG. 8, to control the rate of increase in brake fluid pressure supplied to the wheel brake 11.

First, in step 1802, a slip ratio difference ΔSW between a target slip ratio KTSW (e.g., 12%) and the slip ratio SW derived in step 1610 is determined according to the equation (9) below.

$$\Delta SW^{}(n) \leftarrow KTSW \cdot SW^{}(n) \tag{9}$$

The routine proceeds to step 1804 wherein a cumulative slip ratio difference ΣSX** is determined according to the equation (10) below.

$$\Sigma SX^{}(n) \leftarrow \Sigma SX^{}(n-1) + \Delta SW^{**}(n) \tag{10}$$

The routine proceeds to step 1806 wherein a road irregularity parameter B**(n) indicating the degree of irregularities of a road surface is determined according to the equation (11) below.

$$B^{}(n) \leftarrow dVW^{}(n) - dVX^{**}(n) \tag{11}$$

The routine proceeds to step 1808 wherein the cumulative slip ratio difference ΣSX derived in step 1804 is corrected using the road irregularity parameter B to determine a corrected cumulative slip ratio difference ΣS** according to the equation (12) below.

$$\Sigma S^{}(n) \leftarrow \Sigma SX^{}(n) + K \cdot B^{**}(n) \tag{12}$$

where K is a correction coefficient, for example, one (1).

The routine proceeds to step 1810 wherein it is determined whether a counter value CT of a counter built in the electronic control unit 40 has reached an upper limit KTMAX (e.g., 1000 ms) or not which sets an interval between outputs of the pressure-increasing pulse signals to the actuator 21 to a given period of time. If a NO answer is obtained, then the routine proceeds to step 1812 wherein the corrected cumulative slip ratio difference ΣS is greater than a pressure-increasing pulse output criterion KSI (e.g., 100) or not.

If a NO answer is obtained (ΣS ≦ KSI) meaning that an actual slip ratio of the wheel 1 is not yet decreased to the extent that the brake fluid pressure supplied to the wheel brake 1 begins to be increased, then the routine proceeds to step 1814 wherein a pressure-holding command is issued to hold the pressure-increasing pulse signals from being outputted. The routine then proceeds to step 1816 wherein the counter value CT is incremented by one (1) and terminates.

Alternatively, if a YES answer is obtained in step 1812, the corrected cumulative slip ratio difference ΣS has exceeded the pressure-increasing pulse output criterion KSI before the counter value CT reaches the upper limit KTMAX. Therefore, the routine proceeds to step 1818 which determines whether the count value CT is greater than a lower limit KTMIN (e.g., 50 ms) or not. If a NO answer is obtained, then the routine proceeds to step 1814. Alternatively, if a YES answer is obtained, then the routine proceeds to step 1820 wherein a pressure-increasing command is issued to output the pressure-increasing pulse signals to the actuator 21. The routine then proceeds to step 1822 wherein the cumulative slip ratio difference ΣSX and the counter value CT** are reset to zero (0) and terminates.

If a YES answer is obtained in step 1810, then the YES answer is obtained necessarily in step 1818, and the routine proceeds to step 1820 wherein the pressure-increasing command is issued. This prevents the interval between outputs of the pressure-increasing pulse signals from being increased undesirably for some reason, for example, noise which will hold the brake fluid pressure from being increased for an extended period of time.

If the YES answer is obtained in step 1812, but the NO answer is obtained in step 1818, the routine proceeds to step 1814 wherein the pressure-holding command is issued. This avoids a malfunction which precludes the increase in brake fluid pressure from following the outputs of the pressure-increasing pulse signals because intervals between the outputs of the pressure-increasing pulse signals are very short.

After completion of the operation in step 1700, the routine proceeds to step 1900 wherein the so-called select low control is performed wherein the wheel brakes 12 and 13 for rear left and right wheels 2 and 3 are controlled simultaneously based on the greater of slippages of the rear left and right wheels 2 and 3. The routine then returns back to step 1100.

Figure 9:
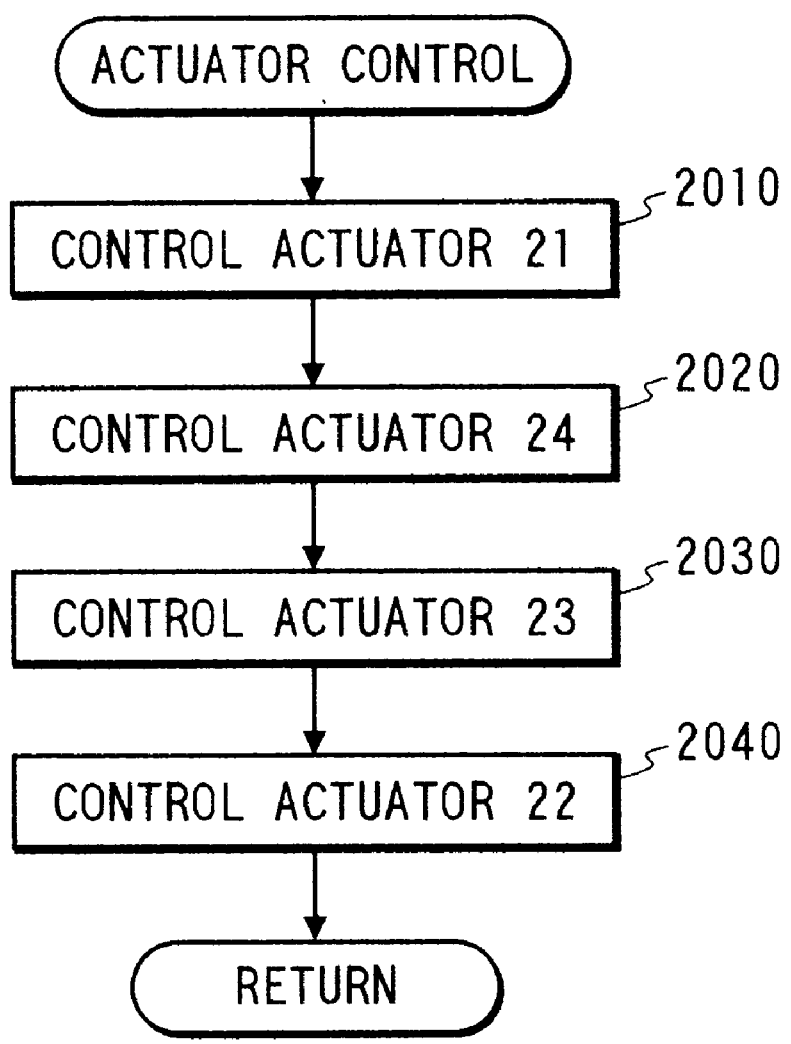
FIG. 9 is a flowchart of a sub-program for controlling actuators.

FIG. 9 shows an actuator control program performed by timer interruption at intervals of, for example, 1ms to control the wheel cylinder pressures W/C through the actuators 21 to 24 according to the brake control modes determined in step 1700.

First, in step 2010, the solenoid of the actuator 21 for the front right wheel 1 is controlled in a manner, as shown in FIG. 10, according to selected one of the brake control modes. Similarly, in steps 2020, 2030, and 2040, the actuators 22 to 24 are controlled in the brake control modes determined in step 1700.

For example, when the driver-controlled brake mode is selected for the front right wheel 1, the actuator 21 is turned off to assume the pressure rise enable valve position A, allowing the brake fluid pressure developed by the master cylinder 16 to be transmitted directly to the wheel brake 11.

When the pressure-reducing mode is selected for the front right wheel 1, a pressure-reducing current and a pressure-holding current are supplied to the actuator 21 cyclically. Specifically, the actuator 21 is switched between the pressure-holding valve position B and the pressure-reducing valve position C repeatedly in a manner wherein the pressure-reducing valve position C is held for a given period of time TD (e.g., 15 ms) and then changed to the pressure-holding valve position B for a given period of time TH (e.g., 15 ms). The pressure-reducing pulse signal may continue to be outputted to hold the actuator 21 in the pressure-reducing position C.

When the pressure-holding mode is selected for the front right wheel 1, a pressure-holding current continues to be supplied to the actuator 21 to hold the pressure-holding valve position B.

When the pressure-stepping up mode is selected for the front right wheel 1, a pressure-increasing current is outputted to the actuator 21 for a given period of time KU (e.g., 3 ms) to assume the pressure rise enable position A upon issuance of the pressure-increasing command in step 1820, and then the pressure-holding current is outputted to the actuator 21 to assume the pressure-holding valve position B until the pressure-increasing command is issued again in step 1820. The number of times the pressure-increasing current or pulse signal is outputted is set to 10, for example. Thus, when the pressure-increasing pulse signal is supplied to the actuator 21 ten times, the YES answer is obtained in step 1720 in FIG. 7. The antiskid brake control flag is reset to zero (0) in step 1706. The driver-controlled brake mode is entered in step 1708.

Figure 11:
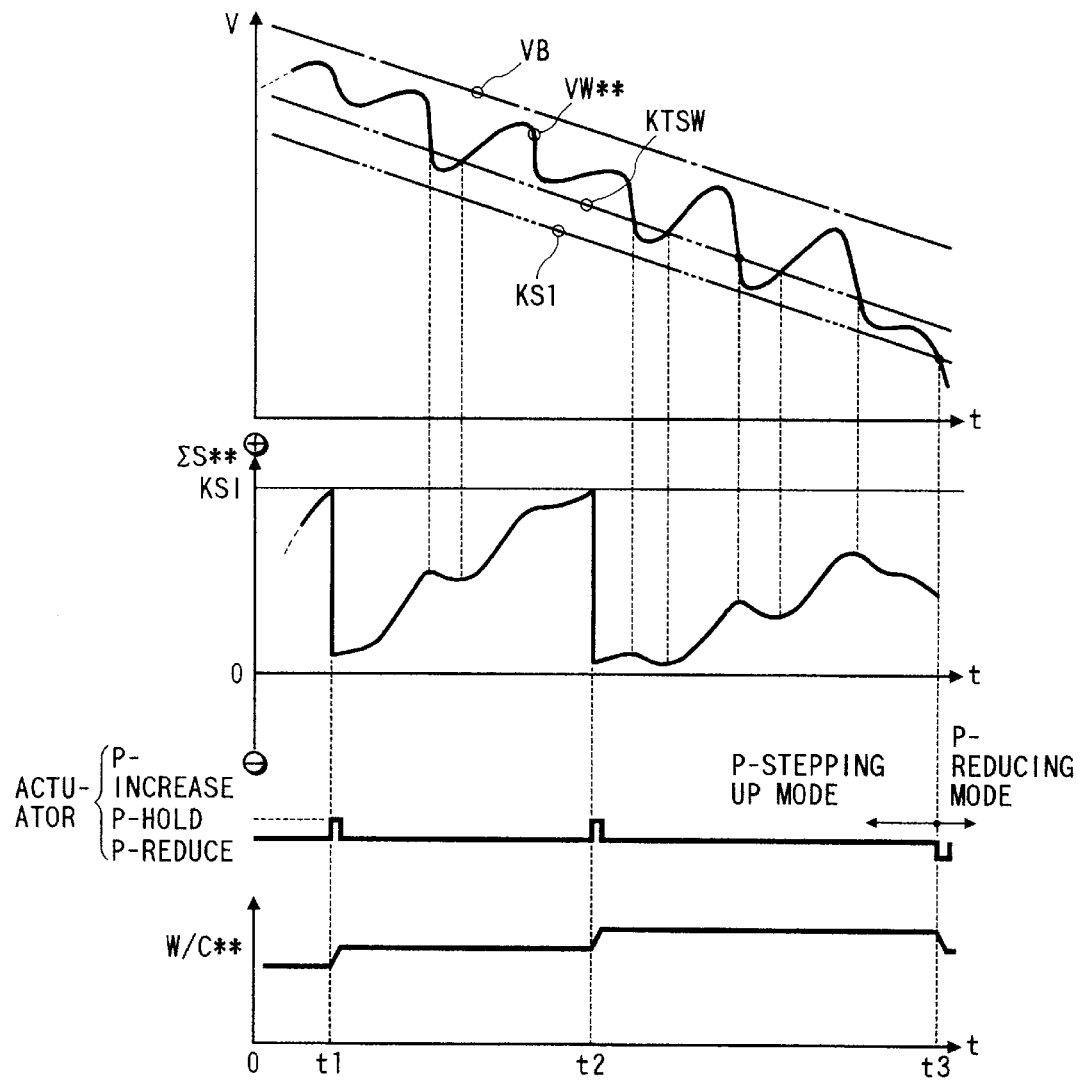
FIG. 11 is a time chart which shows an operation of an antiskid brake system of the first embodiment.
Figure 12:
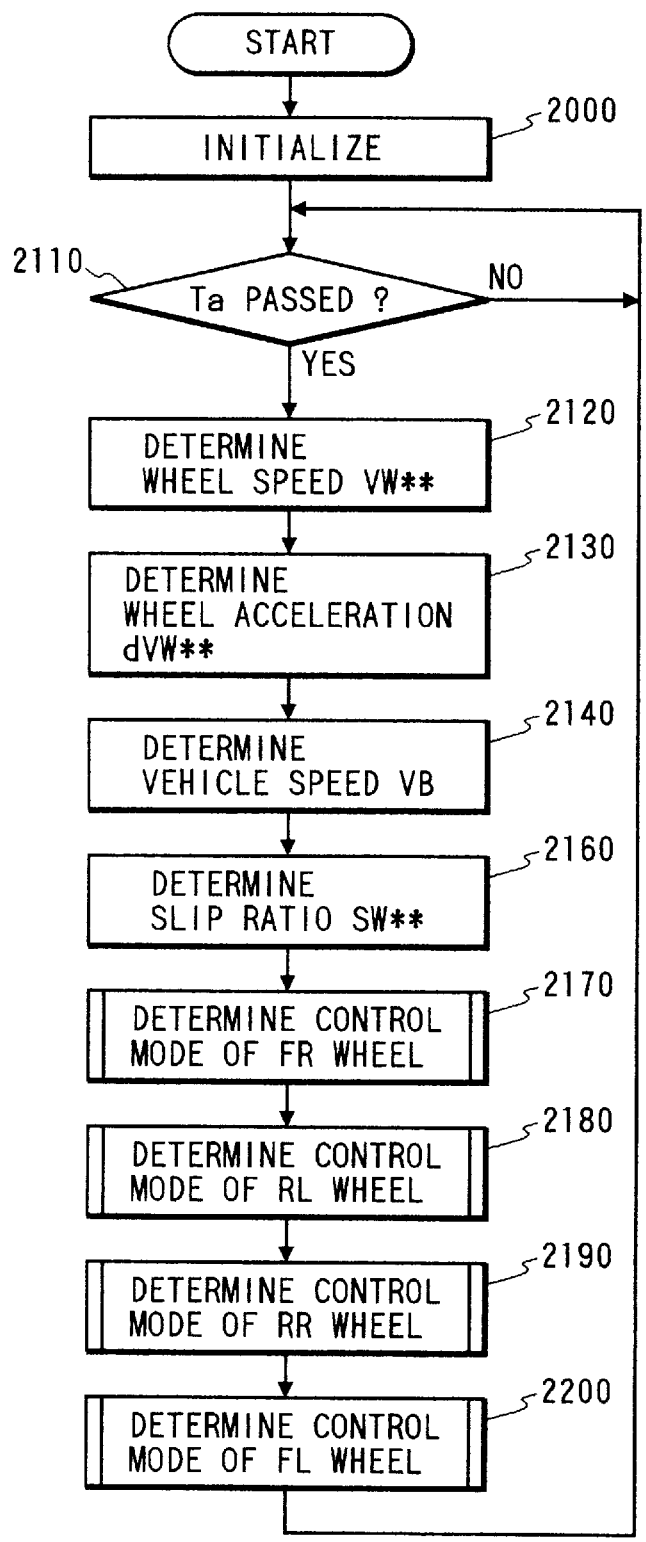
FIG. 12 is a flow chart which shows an antiskid brake system according to the second embodiment of the invention.

FIG. 11 shows a time chart of the brake control, as discussed above, which exemplifies a case where the pressure-stepping up mode is switched to the pressure-reducing mode during the antiskid brake control when the road irregularity parameter B**(n)=0.

The cumulative slip ratio difference ΣSX is increased gradually until time t1 according to the operation in step 1804 so that the corrected cumulative slip ratio difference ΣS is increased gradually according to the operation in step 1808. When the corrected cumulative slip ratio difference ΣS reaches the pressure-increasing pulse output criterion KSI at time t1 where the counter value CT is greater than the lower limit KTMIN, the pressure-increasing command is issued in step 1820 to output the pressure-increasing pulse signals to selected one of the actuators 21 to 24, thereby increasing the wheel cylinder pressure W/C** slightly as shown in the drawing.

If the routine in FIG. 7 flows from step 1702 to steps 1712 and 1720, and the NO answer is obtained in step 1720 after the cumulative slip ratio difference ΣSX and the counter value CT are cleared in step 1822 in a previous program cycle, the cumulative slip ratio difference ΣSX is increased again according to the operation in step 1804 so that the corrected cumulative slip ratio difference ΣS is increased according to the operation in step 1808. When the corrected cumulative slip ratio difference ΣS reaches the pressure-increasing pulse output criterion KSI at time t2 where the counter value CT is greater than the lower limit KTMIN, the pressure-increasing command is issued in step 1820 to output the pressure-increasing pulse signals to selected one of the actuators 21 to 24, thereby increasing the wheel cylinder pressure W/C** further as shown in the drawing.

Subsequently, if it is concluded in step 1712 that the slip ratio SW has exceeded the second target slip ratio KS1 while the cumulative slip ratio difference ΣSX is increased again so that the corrected cumulative slip ratio difference ΣS is increased, the routine proceeds to step 1714 wherein it is determined whether a change in the wheel speed VW is not yet reversed from the deceleration direction to the acceleration direction due to release of the braking effort by the brake fluid pressure control, that is, whether the wheel acceleration dVW derived in step 1300 is smaller than zero (0 G) or not. If it is concluded that the wheel acceleration dVW is smaller than 0 G and that the wheel speed VW is still changing in the deceleration direction, selected one of the actuators 21 to 24 is switched to the pressure-reducing valve position C so that the wheel cylinder pressure W/C is reduced in the pressure-reducing mode. Subsequently, as long as the pressure-reducing mode continues, the pressure-reducing pulse signal and the pressure-holding pulse signal are supplied to the selected one of the actuators 21 to 24** cyclically so that the wheel cylinder pressure W/C is decreased gradually.

The antiskid brake system of this embodiment, as apparent from the above discussion, increases the brake fluid pressure based on a corrected value of the cumulative slip ratio difference ΣSX or the corrected cumulative slip ratio difference ΣS when it is required to increase the brake fluid pressure during the antiskid brake control. Therefore, even if it is required to increase the brake fluid pressure to eliminate an instant wheel slippage caused by a small change in road-tire adhesive $\mu$, irregularities of a road surface, turning of the vehicle, or a difference in wheel diameter, the brake fluid pressure is not increased immediately, thereby ensuring the stability of the antiskid brake control.

Further, the increase in brake fluid pressure is achieved stepwise by pulse signals. When the corrected cumulative slip ratio difference ΣS is increased rapidly, it will cause a time interval until the corrected cumulative slip ratio difference ΣS reaches the pressure-increasing pulse output criterion KSI to be shortened according to an inclination of the increase in the corrected cumulative slip ratio difference ΣS**, so that the number of times the pressure-increasing pulse signal is outputted, that is, the rate at which the brake fluid pressure is adjusted is also changed. This achieves the brake fluid pressure control according to the degree of change in slip ratio.

The determination of the corrected cumulative slip ratio difference ΣES in step 1808 is also based on the road irregularity parameter B(n). Thus, even if the wheel speed drops rapidly due to irregularities of the road surface, the increase in brake fluid pressure is not delayed undesirably, ensuring the stability of the antiskid brake control.

The increase in brake fluid pressure in the pressure-stepping up mode is achieved by controlling the output of the pressure-increasing pulse signals based on the cumulative slip ratio difference ΣSX or the corrected cumulative slip ratio difference ΣS, but the decrease in brake fluid pressure may also be achieved by controlling the output of the pressure-reducing pulse signals based on the corrected cumulative slip ratio difference ΣS. Specifically, if a positive answer is obtained in step 1714, then the same operations as in steps 1720 and 1722 may be performed to provide the pressure-reducing pulse signals in a cycle determined based on the corrected cumulative slip ratio difference ΣS.

The operation in step 1812 may alternatively be performed based on the cumulative slip ratio difference ΣSX without taking the road irregularity parameter B(n) into account.

The vehicle speed VBW of each of the wheel 1 to 4 is determined in step 1580**, but may be replaced with the common vehicle speed VB.

A difference between an actual slip ratio and a target slip ratio (i.e., the slip ratio difference ΔSW**) is used as indicating a slipping condition of each wheel, but a difference between a target wheel speed that is a physical quantity corresponding to the target slip ratio and an actual wheel speed that is a physical quantity corresponding to the actual slip ratio may also be used. The slipping condition may be determined based on an inverse number of the actual slip ratio or an inverse number of a difference between the vehicle speed and the actual wheel speed. This offers the advantage in that the slipping condition can be determined regardless of the target slip ratio. Specifically, as an actual wheel slippage becomes great, the slipping condition is determined as being a smaller value so that an integral value thereof becomes small, thereby resulting in delay in increasing the brake fluid pressure.

In typical antiskid brake systems or traction control systems, it is essential to evaluate a braking condition of each wheel. For example, in the antiskid brake control, the braking pressure acting on a controlled wheel is decreased, increased, and held cyclically according to the braking condition of the wheel to bring wheel slippage into a condition which allows the wheel to be braked quickly and in safety. In other words, the wheel is so controlled that a slip ratio thereof lies near the peak of a tire-road adhesion $\mu$ (generally, 10% to 20% in slip ratio) as long as possible.

Such antiskid brake control usually adjusts brake fluid pressures applied to wheels independently.

However, in four-wheel drive vehicles and vehicles equipped with a limited slip differential (LSD) which produces a rotation-restraint is produced between wheels so that the braking effort or driving torque is transmitted from one of the wheels to the other. It is thus impossible to determine the braking condition of each wheel in the same manner as that in the antiskid brake control adjusting the brake fluid pressure applied to the wheels independently.

As a simple example, slippage occurring in four-wheel drive vehicles will be discussed below.

Usually, in four-wheel drive vehicles, front and rear axles are restrained through a drive system. Specifically, when a center differential gear is locked, the front and rear axles are rotated synchronously. Accordingly, for example, when a brake is applied only on a front right wheel to reduce a wheel speed thereof to 0.8 times a vehicle speed before antiskid brake control is entered, actual wheel speeds VwFL and VwFR of the front left and front right wheels may be expressed below using a decrease in vehicle speed ΔV.

VwFL=1−ΔV, VwFR=0.8−ΔV

Each of rear left and rear right wheels is $$(VwFL + VwFR)/2 = [(0.8 - \Delta V) + (1 - \Delta V)]/2$$
$$= 0.9 - \Delta V$$

Thus, if a wheel slippage is proportional to a braking force, the braking force required to adjust the wheel speed VwFR of the front right wheel to 0.8 times the vehicle speed before the antiskid brake control is entered in the case where all the wheels are driven independently from each other is

1−0.8=0.2

In contrast, if the center differential gear is locked in the four-wheel drive vehicle, that braking force is (1−0.8)+(1−0.9)=0.3

This means that an average slippage of the rear wheels is added to a slippage of the front right wheel.

Specifically, it is impossible to use in a four-wheel drive vehicle the same brake control as in a vehicle whose wheels are driven independently. The same is true for vehicles equipped with a limited slip differential (LSD) because a slippage of a wheel on one side is suppressed to delivery torque of that wheel to a wheel on the other side through the LSD.

An antiskid brake system, as will be discussed below, according to the second embodiment of the invention is designed to alleviate the above disadvantage.

FIGS. 12 to 15 show flowcharts of an antiskid brake control program performed by the electronic control unit 40 of the antiskid brake system of the second embodiment.

After entering the program, the routine proceeds to step 2000 wherein initialization is performed to clear a memory and reset flags.

The routine proceeds to step 2100 wherein it is determined whether a given period of time Ta (e.g., 5 ms) has passed or not which is a time interval during which a sequence of operations following step 2100 is carried out.

If a YES answer is obtained, then the routine proceeds to step 2120 wherein wheel speed VW** of each of the wheels 1 to 4 is determined based on a signal from one of the wheel speed sensors 5 to 8.

The routine proceeds to step 2130 wherein wheel acceleration dVX of each of the wheels 1 to 4 is determined by differentiating the wheel speed VW.

The routine proceeds to step 2140 wherein vehicle speed VB is determined according to the same sub-program as shown in FIG. 4.

The routine proceeds to step 2160 wherein a slip ratio SW of each of the wheels 1 to 4 is determined based on the wheel speed Vw derived in step 2120 and the vehicle speed VB derived in step 2140. For example, the slip ratio SW is determined according to the relation of SW= (VB−VW**)/VB.

Figure 13:
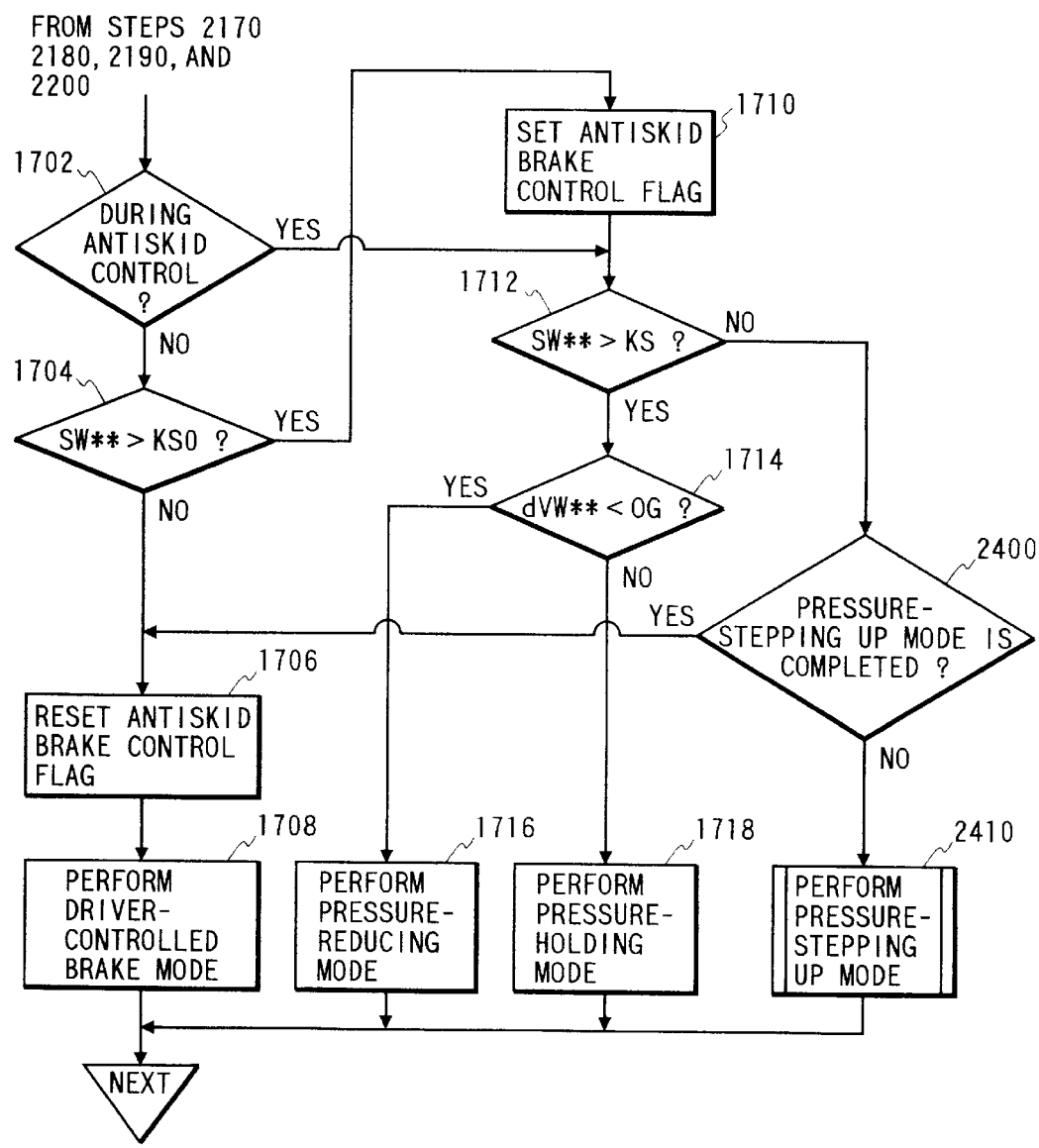
FIG. 13 is a flowchart of a sub-program which determines a control mode of each wheel.

After the slip ratio SW** of each of the wheels 1 to 4 is determined, the routine proceeds to steps 2170, 2180, 2190, and 2200 wherein a brake control mode of each of the wheels 1 to 4 is determined according to a sub-program as shown in FIG. 13.

In FIG. 13, the same step numbers as employed in FIG. 7 refer to the same steps, and explanation thereof in detail will be omitted here.

Specifically, in step 2400, it is determined whether a pressure-stepping up mode, as described later in detail, has been performed a given number of times or not. If a NO answer is obtained in step 2400, then the routine proceeds to step 2410 wherein the pressure-stepping up mode is entered again.

FIG. 16 shows operations of each of the actuators 21 to 24 in the pressure-reducing mode, the pressure-holding mode, the pressure-stepping up mode, and the driver-controlled brake mode.

When the driver-controlled brake mode is entered, selected one of the actuators 21 to 24 is turned off to assume the pressure rise enable valve position A, allowing the brake fluid pressure developed by the master cylinder 16 to be transmitted directly to corresponding one of the wheel brakes 11 to 14.

When the pressure-reducing mode is entered, a given current is supplied continuously to selected one of the actuators 21 to 24 to hold the pressure-reducing valve position C.

When the pressure-holding mode is entered, a pressure-holding current is supplied continuously to selected one of the actuators 21 to 24 to hold it in the pressure-holding valve position B.

When the pressure-stepping up mode is entered, the pressure-holding current is supplied to selected one of the actuators 21 to 24 for a given period of time (KH1, KH2, or KH3) and then a pressure-increasing current is supplied thereto for a given period of time KU (e.g., 3 ms) to select between the pressure-holding valve position B and the pressure rise enable valve position A cyclically. Specifically, in the pressure-stepping up mode, the wheel cylinder pressure W/C is increased gradually. The number of times the pressure-increasing current or pulse signal is outputted is set to 10, for example. Thus, when the pressure-increasing pulse signal is supplied to the selected one of the actuators 21 to 24 ten times, a YES answer is obtained in step 2400 in FIG. 13. The antiskid brake control flag is reset to zero (0) in step 1706. The pressure rise enable mode is entered in step 1708.

Figure 14:
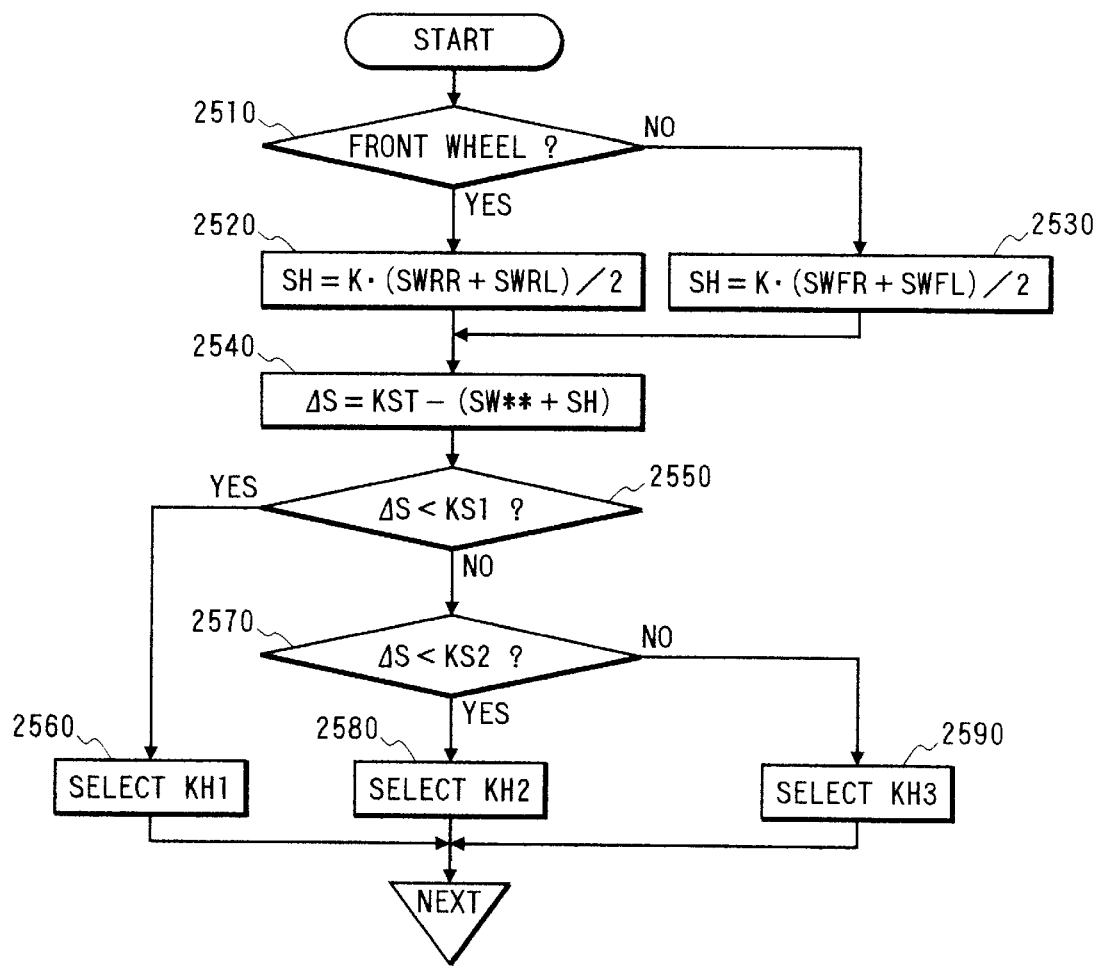
FIG. 14 is a flowchart of a sub-program which determines a rate of increase in brake fluid pressure in a pressure-stepping up mode.

The given period of time (KH1, KH2, or KH3) during which the pressure-holding current is provided in the pressure-stepping up mode is determined in step 2410 according to a sub-program as shown in FIG. 14.

After entering step 2410 in FIG. 13, the routine proceeds to step 2510 wherein it is determined whether a wheel to be controlled is either of the front wheels 1 and 4 or either of the rear wheels 2 and 3. If it is concluded that the wheel to be controlled is either of the front right and left wheels 1 and 4, then the routine proceeds to step 2520 wherein a corrected slip ratio SH is determined by multiplying an average value of slip ratios SWRL and SWRR of the rear left and rear right wheels 2 and 3 by a preselected weighting coefficient K according to the equation (13) below.

$$SH=K(SWRR+SWRL)/2 \tag{13}$$

Alternatively, if a NO answer is obtained in step 2510 meaning that the wheel to be controlled is either of the rear left and rear right wheels 2 and 3, then the routine proceeds to step 2530 wherein the corrected slip ratio SH is determined by multiplying an average value of slip ratios SWFR and SWFL of the front right and front left wheels 1 and 4 by the preselected weighting coefficient K according to the equation (14) below.

$$SH = K(SWFR + SWFL)/2 \quad (14)$$

Note that the weighing coefficient K used in the equations (13) and (14) may be 0.8.

After step 2520 or 2530, the routine proceeds to step 2540 wherein a slip ratio ΔS is determined by subtracting the sum of the slip ratio SW of the controlled one of the wheels 1 to 4** and the corrected slip ratio SH from a correction target slip ratio KST (e.g., 12%) according to the equation (15) below.

$$\Delta S = KST - (SW^{**} + SH) \quad (15)$$

The routine proceeds to step 2550 wherein it is determined whether the slip ratio ΔS derived in step 2540 is smaller than a first reference slip ratio KS1 (e.g., 4%) or not. If a YES answer is obtained, then the routine proceeds to step 2560 wherein KH1 (e.g., 200 msec.) is selected as the pressure-holding current output duration.

If a NO answer is obtained in step 2550, then the routine proceeds to step 2570 wherein it is determined whether the slip ratio ΔS is smaller than a second reference slip ratio KS1 (e.g., 8%) or not. If a YES answer is obtained meaning that the slip ratio Δ is greater than the first reference slip ratio KS1 and smaller than the second reference slip ratio KS2, then the routine proceeds to step 2580 wherein KH2 (e.g., 100 msec.) is selected as the pressure-holding current output duration. Alternatively, if a NO answer is obtained, then the routine proceeds to step 2590 wherein KH3 (e.g., 50 msec.) is selected as the pressure-holding current output duration.

As apparent from the above, since the first reference slip ratio KS1 is smaller than the second reference slip ratio KS2, the pressure-holding current output duration meets the relation of KH1>KH2>KH3. Thus, the smaller the slip ratio ΔS, the longer the time during which the wheel cylinder pressure W/C is held. This also means that an increase in wheel cylinder pressure W/C per unit time is decreased as the time during which the wheel cylinder pressure W/C is held becomes longer.

After the control modes of the wheels 1 to 4 or actuators 21 to 24 are selected in steps 2170 to 2200, respectively, the routine returns back to step 2110 and repeats the above described operations.

FIG. 15 shows an actuator control program performed by timer interruption at intervals of, for example, 1 ms to control the wheel cylinder pressures W/C through each of the actuators 21 to 24 in the selected one of the driver-controlled brake mode, the pressure-stepping up mode, the pressure-holding mode, and the pressure-reducing mode in steps 2170 to 2200. Operations in steps 2610 to 2640 are identical with those in FIG. 9, and explanation thereof in detail will be omitted here.

As appreciated from the above discussion, the antiskid brake system of the second embodiment is designed to evaluate the braking condition of each wheel using not only a slippage of a controlled one of the wheels, but also a slippage of another wheel. Specifically, the braking condition of one of the front wheels 1 and 4 is determined taking the wheel slippages of the rear wheels 2 and 3 into account, while the braking condition of one of the rear wheels 2 and 3 is determined taking the wheel slippages of the front wheels 1 and 4 into account. This allows the braking condition of each wheel of a four-wheel drive vehicle in which the rotation-restraint is produced between the wheels to be determined appropriately.

FIG. 17 shows a time chart of the brake control according to the second embodiment as discussed above.

In the time chart, KH2 is selected as the pressure-holding current output duration during the pressure-stepping up mode at a time t1 (see (2) in the drawing), while KH1 is selected as the pressure-holding current output duration at a time t3 because the slip ratio ΔS for determining a rate of increase in wheel cylinder pressure W/C is calculated by subtracting not only the wheel slippage SW of controlled one of the wheels 1 to 4**, but also the corrected slip ratio SH from the correction target slip ratio KST.

Referring to, as a comparative example, a so-called independent brake control system in which the slip ratio ΔS is calculated by subtracting only the wheel slippage SW of controlled one of the wheels 1 to 4** from the correction target slip ratio KST, the pressure-holding current output duration is not changed to KH2 until time t2 and also not changed to KH1 until t4. Specifically, the timing with which the pressure-holding current is switched to the pressure-increasing current is delayed. The reason for this is that, usually, an antiskid brake system is designed to increase the length of time a wheel slip ratio lies near the peak of a tire-road adhesion μ, and incorrect determination of the peak of the road-tire adhesion μ will cause a wheel slippage to be controlled apart from the road-tire adhesion μ.

While the second embodiment refers to the antiskid brake system, it may also be used with a wheel braking condition determining device of a traction control system in which the driving effort is controlled by adjusting an open of a throttle valve.

The second embodiment may also be used with a two-wheel drive vehicle equipped with a limited slip differential (LSD). In this case, a braking condition of one of right and left wheels between which the LSD is disposed is determined based on slippages of both the right and left wheels.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

The antiskid brake systems, as described above, are used with the front drive vehicle having the so-called X type dual circuit, however, may be used with a rear drive vehicle, a two-wheel vehicle, and a vehicle having a front-rear dual circuit.

What is claimed is:

1. A brake control system comprising:

brake fluid pressure generating units for generating brake fluid pressures according to a braking operation of a driver of the vehicle;

braking force generating units for generating braking forces acting on wheels of the vehicle in response to the brake fluid pressures provided from said brake fluid pressure generating units, respectively;

wheel speed determining means for determining speeds of the wheels, respectively;

vehicle speed estimating means for estimating a vehicle speed based on each of the speeds of the wheels:

skid condition determining means for determining given skid parameters indicating skid conditions of the wheels in a cycle based on the speeds of the wheels determined by said wheel speed determining means and the vehicle speeds estimated by said vehicle speed estimating means to determine cumulative values of the skid parameters, respectively; and pressure regulating means for regulating the brake fluid pressures provided from said brake fluid pressure generating units to said braking force generating units, said pressure regulating means operating in a pressure stepping up mode wherein the brake fluid pressure applied to each of said braking force generating units is increased for a given period of time and then held for a given period of time, when one of the cumulative values reaches a given value during the pressure stepping up mode, said pressure regulating means increasing the brake fluid pressure which is supplied to said braking force generating unit for the wheel corresponding to said one of the cumulative values, wherein said pressure regulating means determines whether each of the brake fluid pressures is to be changed or not based on a slip ratio or a physical quantity corresponding to the slip ratio determined based on the speed of one of the wheels determined by said wheel speed determining means, if it is determined that the brake fluid pressure is to be changed, said pressure regulating means changing the brake fluid pressure provided to corresponding one of said braking force generating units according to corresponding one of the cumulative values determined by said skid condition determining means; and performs a pressure-increasing operation cyclically in which the brake fluid pressure provided to each of said braking force generating units is increased stepwise when a corresponding one of the cumulative values is greater than a given value, and then the one of the cumulative values is cleared to zero.

2. A brake control system as set forth in claim 1 wherein the number of times the pressure-increasing operation is repeated is fixed at a given value.

3. A brake control system for a vehicle comprising:

brake fluid pressure generating units for generating brake fluid pressures according to a braking operation of a driver of the vehicle;

braking force generating units for generating braking forces acting on wheels of the vehicle in response to the brake fluid pressures provided from said brake fluid pressure generating units, respectively;

wheel speed determining means for determining speeds of the wheels, respectively;

vehicle speed estimating means for estimating a vehicle speed based on each of the speeds of the wheels:

skid condition determining means for determining given skid parameters indicating skid conditions of the wheels in a cycle based on the speeds of the wheels determined by said wheel speed determining means and the vehicle speeds estimated by said vehicle speed estimating means to determine cumulative values of the skid parameters, respectively; and pressure regulating means for regulating the brake fluid pressures provided from said brake fluid pressure generating units to said braking force generating units, said pressure regulating means operating in a pressure stepping up mode wherein the brake fluid pressure applied to each of said braking force generating units is increased for a given period of time and then held for a given period of time, when one of the cumulative values reaches a given value during the pressure stepping up mode, said pressure regulating means increasing the brake fluid pressure which is supplied to said braking force generating unit for the wheel corresponding to said one of the cumulative values wherein said pressure regulating means regulates the brake fluid pressure provided to said braking force generating units based on values derived by correcting the cumulative values using given parameters indicating irregularities of a road surface and said given parameter is a difference between an average acceleration of the wheel for a given period of time and an actual acceleration of the wheel.

4. An antiskid brake control system for a vehicle comprising:

brake fluid pressure generating means for generating a brake fluid pressure according to a braking operation of a driver of the vehicle;

braking force generating means for generating a braking force acting on a wheel of the vehicle in response to the brake fluid pressure provided from said brake fluid pressure generating means;

wheel speed determining means for determining a speed of the wheel;

pressure regulating means for regulating the brake fluid pressure provided from said brake fluid pressure generating means to said braking force generating means for optimizing a braking effort acting on the wheel;

skid condition determining means for determining a given skid parameter indicating a skid condition of the wheel in a cycle based on the speed of the wheels determined by said wheel speed determining means to determine a cumulative value of the skid parameters; and timing determining means for determining timing, with which said pressure regulating means regulates the brake fluid pressure provided to said braking force generating means, according to the cumulative value of the skid parameters determined by said skid condition determining means.

5. A brake control system comprising:

brake fluid pressure generating units for generating brake fluid pressures according to a braking operation of a driver of the vehicle;

braking force generating units for generating braking forces acting on wheels of the vehicle in response to the brake fluid pressures provided from said brake fluid pressure generating units, respectively;

wheel speed determining means for determining speeds of the wheels, respectively;

vehicle speed estimating means for estimating a vehicle speed based on each of the speeds of the wheels:

skid condition determining means for determining given skid parameters indicating skid conditions of the wheels in a cycle based on the speeds of the wheels determined by said wheel speed determining means and the vehicle speeds estimated by said vehicle speed estimating means to determine cumulative values of the skid parameters, respectively wherein each of the skid parameters is an inverse number of a slip ratio of one of the wheels; and pressure regulating means for regulating the brake fluid pressures provided from said brake fluid pressure generating units to said braking force generating units, said pressure regulating means operating in a pressure stepping up mode wherein the brake fluid pressure applied to each of said braking force generating units is increased for a given period of time and then held for a given period of time, when one of the cumulative values reaches a given value during the pressure stepping up mode, said pressure regulating means increasing the brake fluid pressure which is supplied to said braking force generating unit for the wheel corresponding to said one of the cumulative values.

6. A brake control system comprising:

brake fluid pressure generating units for generating brake fluid pressures according to a braking operation of a driver of the vehicle;

braking force generating units for generating braking forces acting on wheels of the vehicle in response to the brake fluid pressures provided from said brake fluid pressure generating units, respectively;

wheel speed determining means for determining speeds of the wheels, respectively;

vehicle speed estimating means for estimating a vehicle speed based on each of the speeds of the wheels, wherein said vehicle speed estimating means determines a common vehicle speed based on the speeds of the wheels, calculates a change in common vehicle speed, adds a correction value to the change in common vehicle speed, and uses the correction value-added change in common vehicle speed as a lower limit guard against a change in estimated vehicle speed determined for each of the wheels to estimate the vehicle speed based on each of the speeds of the wheels:

skid condition determining means for determining given skid parameters indicating skid conditions of the wheels in a cycle based on the speeds of the wheels determined by said wheel speed determining means and the vehicle speeds estimated by said vehicle speed estimating means to determine cumulative values of the skid parameters, respectively; and pressure regulating means for regulating the brake fluid pressures provided from said brake fluid pressure generating units to said braking force generating units, said pressure regulating means operating in a pressure stepping up mode wherein the brake fluid pressure applied to each of said braking force generating units is increased for a given period of time and then held for a given period of time, when one of the cumulative values reaches a given value during the pressure stepping up mode, said pressure regulating means increasing the brake fluid pressure which is supplied to said braking force generating unit for the wheel corresponding to said one of the cumulative values.

\* \* \* \* \*